US008151344B1

(12) United States Patent
Channakeshava

(10) Patent No.: US 8,151,344 B1
(45) Date of Patent: Apr. 3, 2012

(54) METHOD AND APPARATUS TO AUTHENTICATE A USER

(75) Inventor: Girish Mallenahally Channakeshava, Bangalore (IN)

(73) Assignee: Intuit Inc., Mountain View, CA (US)

( * ) Notice: Subject to any disclaimer, the term of this patent is extended or adjusted under 35 U.S.C. 154(b) by 675 days.

(21) Appl. No.: 12/362,141

(22) Filed: Jan. 29, 2009

(51) Int. Cl.
*H04L 9/32* (2006.01)
*H04L 9/00* (2006.01)
(52) U.S. Cl. ................. 726/19; 726/16; 726/17; 726/18; 726/27; 726/28; 713/168; 713/169; 713/170; 713/171; 713/172
(58) Field of Classification Search ...................... 726/19
See application file for complete search history.

(56) References Cited

U.S. PATENT DOCUMENTS
2002/0133459 A1* 9/2002 Polk et al. ...................... 705/40
* cited by examiner

*Primary Examiner* — Longbit Chai
(74) *Attorney, Agent, or Firm* — Park, Vaughan, Fleming & Dowler LLP

(57) ABSTRACT

One embodiment provides a system that uses an authenticated channel to authenticate a user. The system can register a user by storing an association between a username, a password, and a unique identifier. The system can then present a login screen to the user which includes a username field and a password field, wherein the username field is enabled and the password field is disabled. Next, the system can receive the username via the username field and receive the unique identifier over the authenticated channel. The system can then enable the password field in response to determining that the unique identifier is associated with the username. Next, the system can receive the password via the enabled password field. The system can then authenticate the user in response to determining that the password is associated with the username.

21 Claims, 5 Drawing Sheets

METHOD AND APPARATUS TO AUTHENTICATE A USER

BACKGROUND

1. Field

This disclosure is generally related to user authentication. More specifically, this disclosure is related to using an authenticated channel to authenticate a user.

2. Related Art

Authenticating a user involves verifying the user's identity. Broadly, authentication can involve something a user has (e.g., an ID card), something the user knows (e.g., a password), or something physically associated with the user (e.g., a fingerprint).

A computer system typically authenticates a user by presenting username and password input fields to the user. Once the user enters the correct username and password in these fields, the system allows the user to access their account or run specific applications. The computer system typically verifies that the password is correct by performing a lookup based on the username in a password store accessible to the computer system.

Although passwords provide some security to prevent unauthorized access, passwords are relatively easy to steal. For example, a Trojan Horse application can steal passwords from a user's machine and send them back to the hacker. A Trojan Horse application can scan the registry looking for the passwords or scan other files on the disk looking for passwords. Passwords can also be lost, guessed (e.g., birthdays are generally a good guess), or tapped while in transit (e.g., through eavesdropping of a wireless network). Moreover, since a user often uses the same password in multiple places, a discovered password can open the door to those multiple places. Finally, passwords are rarely of a length or complexity that makes them secure. For example, many people choose English words as passwords or 6 digit letter combinations as passwords. Such passwords can often be cracked by a password-cracking program. Once the username is provided, a password cracker can fill in the password field until it secures access.

Other authentication methods include PKI (Public Key Infrastructure) certificates, login tokens, smart cards, and other personal information. A PKI binds a user's public key with a unique user identity through a CA (Certificate Authority), typically a third party. A PKI certificate combines a user's digital signature and a user's public key with another identifier (e.g., a user's real name). The user can use the certificate to show that the user owns the claimed public key. Typically, a digital signature is required for the PKI certificate. This signature can either be made by an authority figure who assigns the certificates, the person whose identity is being confirmed, or even endorsers of the public key. The digital signature is a way for other parties and people to verify that a person is, in fact, the owner of the public key they claim is their own. One shortcoming of a PKI is that the CA must be trusted by all parties involved.

A login token is a client-side certificate that is stored in the user's browser. When the user attempts to access a restricted page, a secure server can ask the user's browser to present such a client-side certificate and to prove that the user is the actual owner. Typically, a login server issues a fixed-duration login token at login time. The login server also issues a fixed-duration granting token every time the user wants to access a new secured site. When the user tries to access a secured application, the application will check for the presence of a granting token. If found, the system will issue a fixed-duration session token. The session token exists for the duration of the user's session with that application. In short, login tokens enable logins to the portal without a password. A hash key to the login token is typically stored in the system. As a result, a malicious user can retrieve this key and attempt to reverse engineer the key to generate unauthorized login tokens.

Smart cards are devices that plug into a computer's USB to authenticate a user. Unfortunately, smart cards, like car keys, can be stolen and used to masquerade as a user. Specifically, since smart cards may not be used by the user frequently, the user may not realize that his or her smart card has been stolen for many hours or days. Moreover, the information contained in a smart card can be tapped and copied if smart cards are used for network access. Other personal information used for identification (e.g., birthdays, Social Security numbers, and addresses) can also be obtained relatively easily. In short, conventional techniques for authenticating a user suffer from various drawbacks.

SUMMARY

One embodiment provides a system that uses an authenticated channel to authenticate a user. The system can register a user by receiving a username, a password, and a unique identifier, which are associated with the user. Next, the system can create an association between the username, the password, and the unique identifier, and store the association. The system can then present a login screen to the user which includes a username field and a password field, wherein the username field is enabled and the password field is disabled. Subsequently, the system can authenticate the user by receiving the username via the username field and receiving the unique identifier over the authenticated channel. Next, the system can enable the password field in response to determining that the unique identifier is associated with the username. The system can then receive the password via the enabled password field. Next, the system can authenticate the user in response to determining that the password is associated with the username. Note that the unique identifier is associated with the user and the authenticated channel does not allow anyone other than the user to send the unique identifier over the authenticated channel.

In some embodiments, the unique identifier includes a mobile phone number uniquely associated with the user.

In some embodiments, a unique identifier includes a random number uniquely associated with the user.

In some embodiments, receiving a unique identifier over the authenticated channel includes one of: the user calling an authentication phone number, or the user sending an SMS (short message service) message to the authentication phone number.

In some embodiments, the authenticated channel includes a mobile phone network, where the unique identifier is a mobile phone number uniquely associated with the user, and where the unique identifier is received over the authenticated channel when the user uses the mobile phone to call an authentication phone number.

In some embodiments, the unique identifier includes a random number associated with the user, and the unique identifier is received when the user uses the mobile phone to call the authentication phone number and enters the random number.

In some embodiments, the authentication phone number is a randomly generated toll-free number which is associated with the user.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage device, which may be any device that can store code and/or data for use by a computer system. The computer-readable storage device includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage device as described above. When a computer system reads and executes the code and/or data stored on the computer-readable storage device, the computer system performs the methods and processes embodied as data structures and code and stored within the computer-readable storage device.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
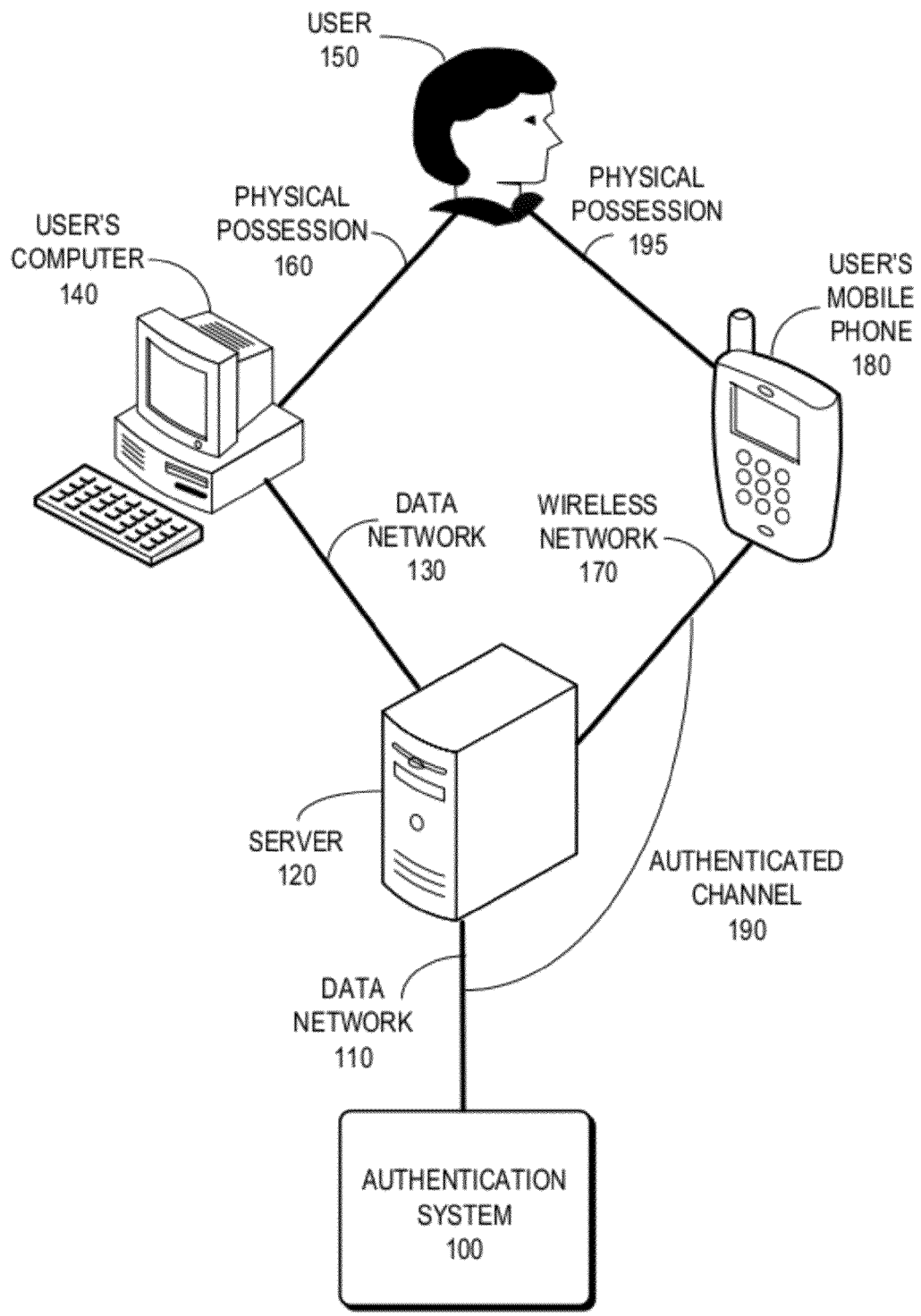
FIG. 1 illustrates an overview of an exemplary system for using an authenticated channel to authenticate a user in accordance with an embodiment.

FIG. 1 illustrates an overview of an exemplary system for using an authenticated channel to authenticate a user in accordance with an embodiment. The authentication system 100 is connected to server 120 via data network 110. Data network 110 can be a wired or wireless communication network. Server 120 can be a centralized computing system or a distributed computing system linked by other communication networks (not shown). Server 120 can also be a mobile server on which mobile calls can be received. Alternatively, the mobile server can be separate from server 120. When the mobile server is separate from server 120, mobile calls can be received by the mobile server, and the login page can be presented to the user by server 120. Note that, in such embodiments, the mobile server and server 120 would typically be able to communicate with one another via a network.

Server 120 is connected to user's computer 140 via data network 130, which can be a wired or wireless network. Server 120 is also connected to user's mobile phone 180 via wireless network 170. Authenticated channel 190 comprises data network 110 and wireless network 170. Server 120 combines and possibly processes communication from data network 130 and wireless network 170 through data network 110 to authentication system 100. User 150 is in physical possession 160 of user's computer 140 and is in physical possession 195 of user's mobile phone 180. Physical possession means that the user—and no person other than the user—is using user's computer 140 and user's mobile phone 180 to authenticate the user. This use of user's computer 140 and user's mobile phone 180 can be nearly simultaneous, because the user can enter a username in the password field using user's computer 140 and then call a toll-free number from user's mobile phone 180 to facilitate authenticating the user.

Note that server 120 can contain aspects of the secure application, programs, databases, files, and data that the user wishes to access. However, these applications, programs, databases, files, and data that the user wishes to access can also be found on the data network 130 or wireless network 170. For example, data network 130 can include the Internet.

Note also that user's mobile phone 180 need not be mobile. For example, this phone can be a fixed landline and wireless network 170 can be a wired network.

Overview

A mobile phone is perhaps one of the more static objects a person possesses. As such, the mobile phone is becoming an increasingly important part of a person's identity. Thus, the phone number associated with the mobile phone can comprise a user's digital identity. In accordance with embodiments, the system can use a user's mobile phone number through an authenticated channel as part of authenticating a user's digital identity. Note that, in a conventional authentication system, both the username and password fields are usually enabled. Password crackers can take advantage of this dual enablement by repeatedly trying different passwords for the same username.

In contrast, and in accordance with embodiments, the system enables the password field only after the system determines authenticity through the authenticated channel. This method of authentication prevents password cracking because the password field cannot be filled until the unique identifier is received over the authenticated channel. The system can use a user's mobile phone number as an additional part of an authentication process, thus preventing password crackers from obtaining unauthorized access. Note that the authenticated channel has the property that it does not allow anyone other than the user to send the unique identifier over the authenticated channel.

Figure 2:
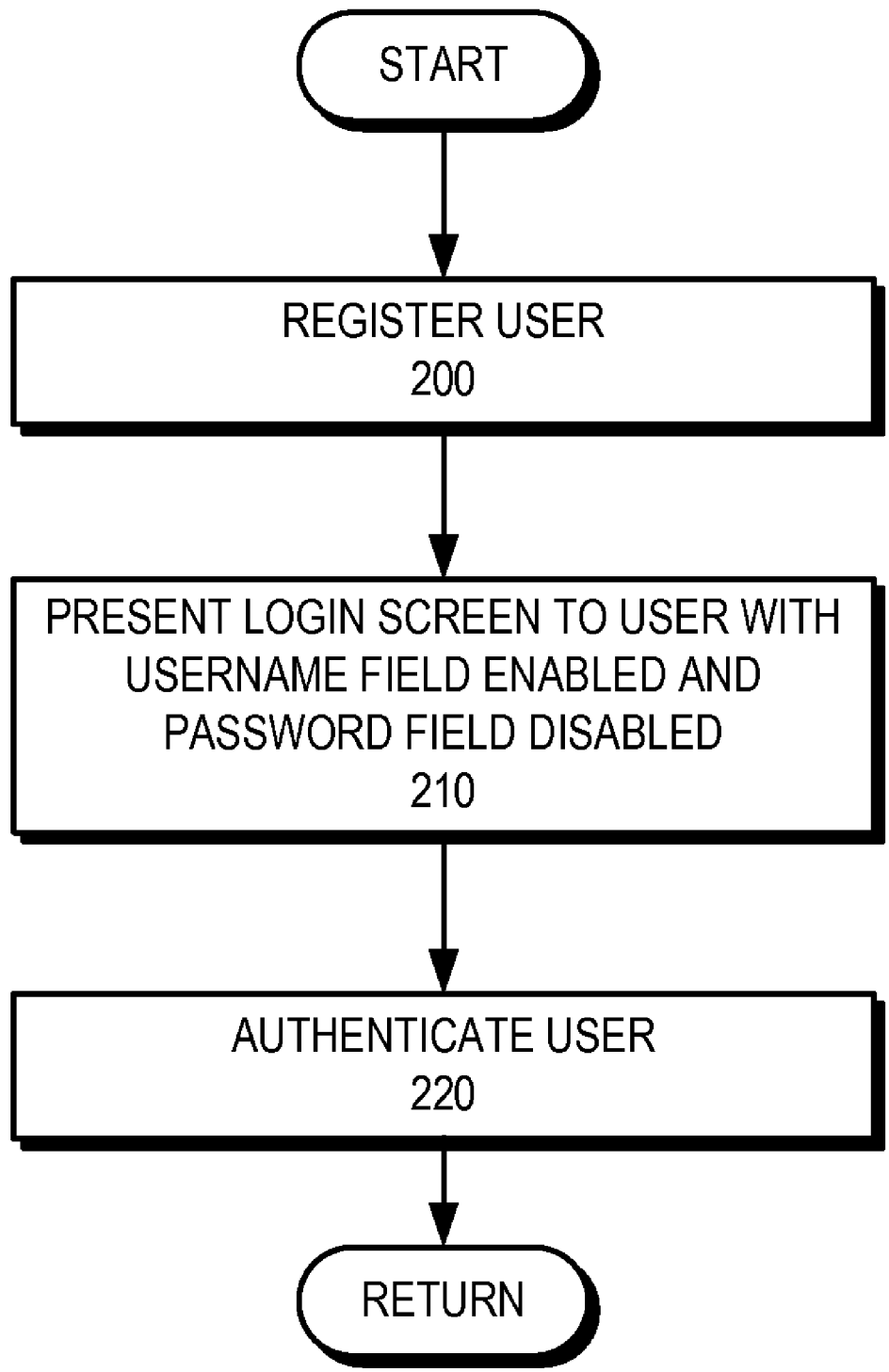
FIG. 2 presents a flowchart illustrating the process of using an authenticated channel to authenticate a user in accordance with an embodiment.

FIG. 2 presents a flowchart illustrating the process of using an authenticated channel to authenticate a user in accordance with an embodiment. Initially, the system registers user (process 200). Subsequently, the system presents a login screen to the user with the username enabled and the password field disabled (process 210). Next, the system authenticates the user (process 220).

Registration

As part of the registration process, the user enters his username and password, which the system then receives. Also as part of the registration process, the system receives a unique identifier. Note that the user can input the username, the password, and the unique identifier using various techniques that can involve using a keypad, voice, pen, gestures, and/or biometric data.

Once the system has received the username, the password, and the unique identifier, it creates an association between the username, password, and unique identifier. The system then stores the association. Subsequently, the system can use this stored association to authenticate a user as part of the authentication process. Note that the system can store the association in a storage device using various techniques which involve using lookup tables, hash tables, b-trees, etc.

Figure 3:
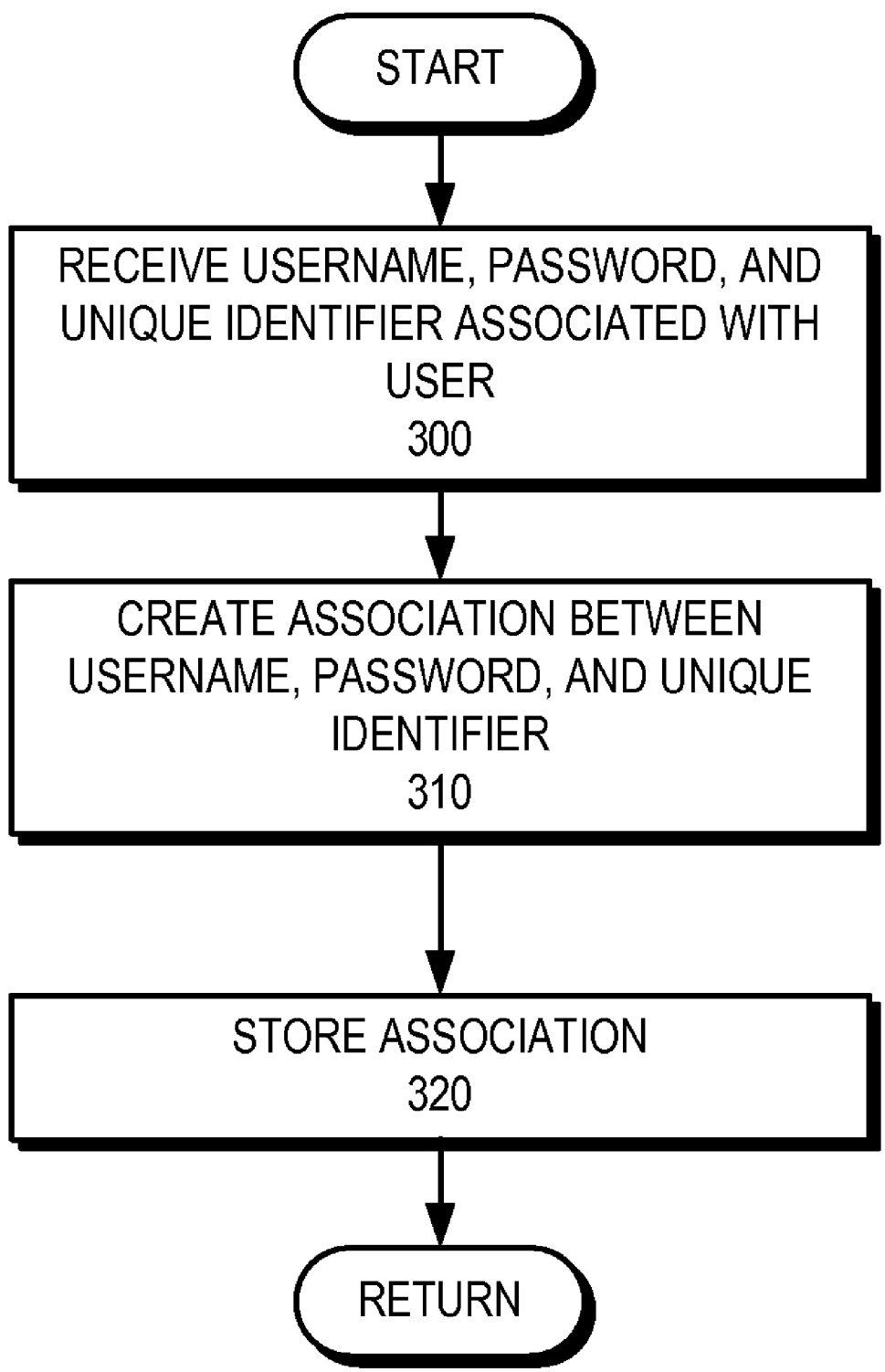
FIG. 3 presents a flowchart illustrating the process of registering the user in accordance with an embodiment.

FIG. 3 presents a flowchart illustrating the process of registering the user in accordance with an embodiment. First, the system receives a username, a password, and a unique identifier associated with the user (step 300). Next, the system creates an association between the username, the password, and the unique identifier (step 310). Finally, the system stores the association (step 320). Specifically, the system can store the association in a computer-readable storage device to enable the system to access the association at a later time. In some embodiments, the system can register a mobile phone number by speaking the registration information over a phone, and the system can either rely on a human operator to enter the registration information into a server, or the system can use voice-recognition technology to extract the registration information from the phone call.

Presenting the Login Screen

After the system has completed the registration process, the user can subsequently log in. As part of the login process, the system presents a login screen to the user which includes an enabled username field and a disabled password field. Until the system receives additional authentication information, the password field is disabled. Note that a malicious user (or any automated process such as a password cracker) cannot type information into the password field when the password field is disabled. By using a disabled password field, some embodiments prevent a malicious user or a malicious automated process from cracking the password by entering different passwords in the password field.

The login screen can be presented in various ways consistent with the information or applications the login is allowing or preventing access to. For example, the login screen might be part of a database access or a computer login access.

Authenticating the User

Figure 4:
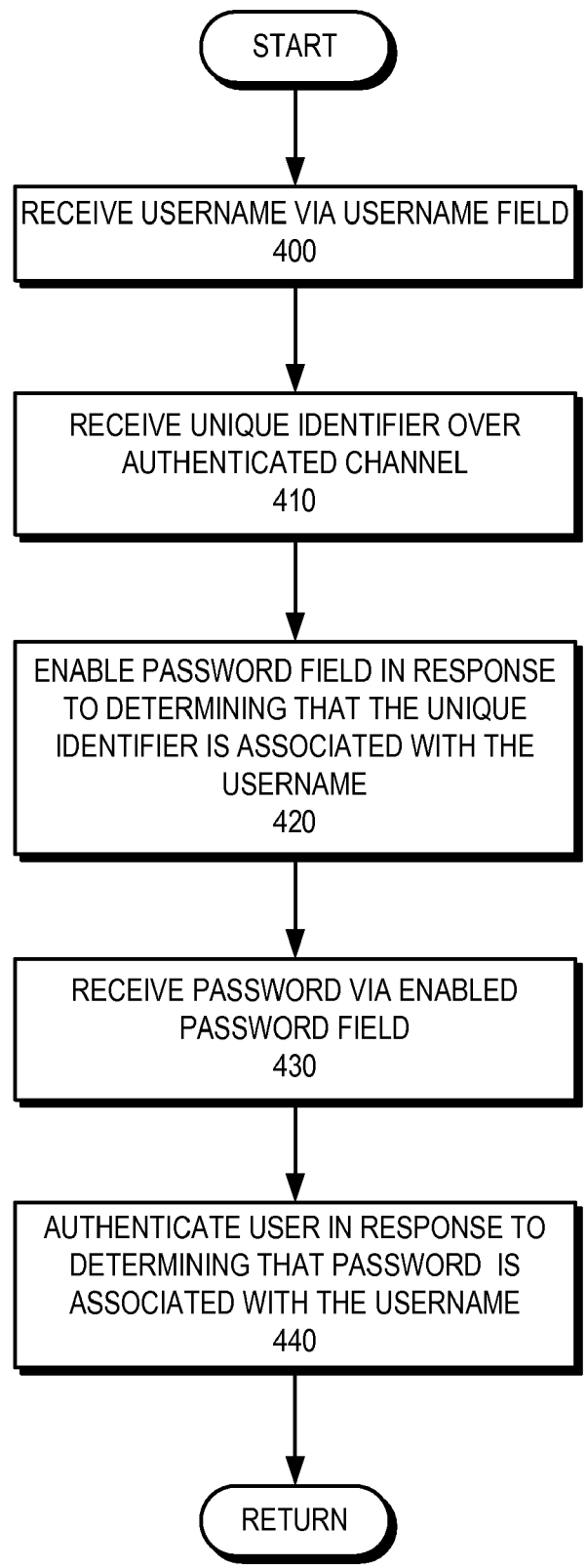
FIG. 4 presents a flowchart illustrating the process of authenticating the user in accordance with an embodiment.

Once the system presents the login screen to the user, the system can authenticate the user. FIG. 4 presents a flowchart illustrating the process authenticating the user in accordance with an embodiment. First, the system receives the username via the username field (process 400). This can mean, for example, that the user types in his username in the username field and the system receives that username. However, the user can communicate his username through various other methods which involve using voice, pen, gestures, and biometric data.

Next, the system receives the unique identifier over the authenticated channel (process 410). The authenticated channel has the property that it does not allow anyone other than the user to send the unique identifier over the authenticated channel. In other words, the authenticated channel prevents another user from masquerading as the user so that the password field can be enabled and cracked. Moreover, because user 150 physically possesses both the user's computer 140 and the user's mobile phone 180, the system can guarantee that a call over the authenticated channel comes from user 150 and not someone masquerading as user 150.

The unique identifier can be received by the system using a number of approaches. In some embodiments, the unique identifier is the user's mobile phone number, and the authenticated channel is the mobile phone network. The user can provide the unique identifier to the system by calling a phone number, e.g., a toll-free number, which is associated with the system. The system can receive the user's mobile phone number as a result of the user calling the phone number associated with the system. For example, when the user calls the toll-free number, the mobile phone network can provide the user's phone number to the system using a service, e.g., a caller-ID service, which is designed to provide the phone number of the calling party.

In a variation, after the user enters the login name (i.e., username), the system may present a phone number to the user to call. This phone number may be dynamically assigned from a pool of phone numbers that the system uses for authentication purposes. Once the user views the phone number on the login screen, the user can call the phone number using his or her mobile phone, thereby providing the unique identifier over the authenticated channel.

In yet another embodiment, the system can generate a random number and associate it with the user. Next, the system can display the random number to the user on the login screen, or the system can send the random number to the user via other means. For example, the system can send the random number to the user's mobile phone via SMS or by calling the user's mobile phone and playing a voice representation of the random number which was generated using a text-to-speech mechanism. When the user wants to provide the unique identifier, the user can do that by (1) calling the system's phone number, and (2) entering the random number. Note that if the system receives the unique identifier before receiving the username, the system can ignore the user's subsequent login attempt.

In some embodiments, the system can select or generate the phone number that the user is supposed to call during registration. For example, when the user registers his or her username and password, the system can provide the user with a unique toll-free number to call. During the authentication process, the user can then call this toll-free number, thereby providing the unique identifier to the system. The system can also generate a random number during the registration process, associate the random number with the username and password, and provide the random number to the user. Then, during the authentication process, the user can provide the random number to the system as part of the authentication step in which the user is required to provide the unique identifier. The user can additionally call the toll-free number, received by the user at registration time, to provide the random number.

Note that, instead of providing the unique identifier by making a phone call, the user can also use any other communication technique that is provided on the user's phone. For example, the user can send an SMS to the system, thereby providing the system with the unique identifier.

Next, the system can enable the password field in response to determining that the unique identifier is associated with the username (process 420). This determination can be based on the stored association between the username, password, and unique identifier.

Next, the system can receive the password via the enabled password field (process 430). On the user's side, this can be accomplished by simply entering the password using a keyboard once the password field is enabled. Note that until the password field is enabled, a user (or any automated process) cannot crack the password by trying out various passwords.

As with the username field, the user can provide the password via various methods which involve using voice, pen, gestures, and biometric data.

Next, the system can authenticate the user in response to determining that the password is associated with the username (process 440). This determination can be based on the stored association between the username, password, and unique identifier. Once the user is authenticated, the user may access the programs, data, and services that the username, password, and unique identifier protect.

Note that some conventional techniques disable or lockout the user account if the user enters the wrong password a certain number of times. Although this approach can limit the number of passwords that a malicious user can guess, it can also lockout a legitimate user from accessing the account. Unlocking the account is typically a very cumbersome and time-consuming process which usually requires the user to talk to a service agent and provide information such as the date of birth and Social Security number. If the lockout occurs when all of the service agents are busy, the user may have to wait for a long period, e.g., for one or more hours, before the user can talk to a service agent. Moreover, if the lockout occurs during a holiday season, the user may have to wait for days or weeks before the user can talk to a service agent.

In contrast to such techniques, some embodiments of the present invention do not place a hard limit on the number of password attempts. In other words, some embodiments of the present invention will allow a user to enter an unlimited number of incorrect passwords as long as the user provides the appropriate unique identifier. However, the user's account can also be locked if the user enters the wrong password repeatedly.

For example, each time a user enters an incorrect password, the system may disable the password field and require the user to provide the unique identifier to enable the password field. Alternatively, the system may disable the password field if the user enters a certain number of incorrect passwords, and then require the user to provide the unique identifier to again enable the password field. In yet another approach, the system can allow the user to try as many passwords as possible for a certain duration or while the login session is active, and then disable the password field. Note that, according to one definition, a login session is a semi-permanent interactive information exchange between communicating devices that is established log into a system. Specifically, a login session can be associated with a transport layer connection or an application layer connection in the TCP/IP model. Note that, in all of these variations, the account is not locked out.

If a hacker enables the password field by cracking the user-interface and then the hacker types in the password, the login will fail because the hacker has not been authenticated through the authenticated channel. This is because the system will only accept the password after it has received both the username via the username field and the unique identifier over the authenticated channel.

Identifying the User's Computer

The system can identify the user's computer in several ways. One way in which the system can identify the user's computer is as follows. The system receives a submitted username via the username field from the user's computer. Next, the system generates a random key on the login screen. Note that the random key can be valid for only a given period of time and can be associated with the username. Next, the system receives a call from the user using the authentication channel (e.g., when the user calls a toll-free number) where the user enters the random key. Subsequently, the system establishes a session with the user's computer, where the random number was displayed.

A second way in which the system can identify the user's computer is as follows. The system receives a submitted username via the username field from the user's computer. Next, the system establishes a session with the user's computer. Subsequently, the system receives a call from the user using the authentication channel (e.g., when the user calls a toll-free number). The system then enables the password field on the user's computer.

A third way in which the system can identify the user's computer is as follows. The system receives a submitted username via the username field from the user's computer. Next, the system receives a call from the user using the authentication channel (e.g., when the user calls a toll-free number). The system then enables the password field on the user's computer. After enabling the password field on the user's computer, the system may decide to only accept the password from the user's computer, i.e., submitting a username from another computer will result in an error.

Apparatus for Authentication

Figure 5:
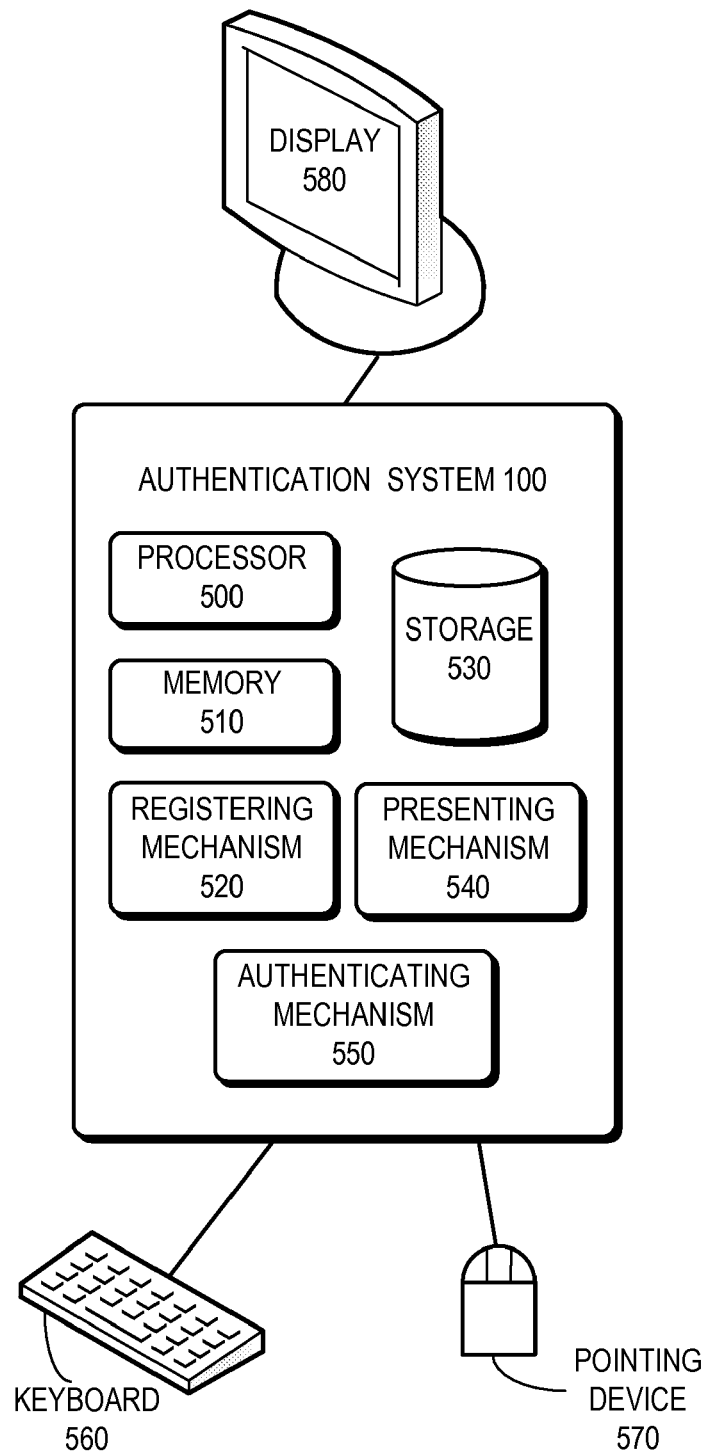
FIG. 5 is an exemplary system for using an authenticated channel to authenticate a user in accordance with an embodiment.

FIG. 5 is an exemplary system for using an authenticated channel to authenticate a user in accordance with an embodiment. Authentication system 100 comprises processor 500, memory 510, storage 530, registration mechanism 520, presenting mechanism 540, and authentication mechanism 550, all of which can be in communication with each other through various means.

For example, processor 500 can communicate through a bus system to memory 510, storage 530, registration mechanism 520, presenting mechanism 540, and authentication mechanism 550. Processor 500 can also communicate through direct couplings to memory 510, storage 530, registration mechanism 520, presenting mechanism 540, and authentication mechanism 550. Processor 500 can also communicate through a local or wide area network (e.g., the Internet) to memory 510, storage 530, registration mechanism 520, presenting mechanism 540, and authentication mechanism 550. Thus, processor 500, memory 510, storage 530, registration mechanism 520, presenting mechanism 540, and authentication mechanism 550 can be on a single chip, in close proximity, or widely distributed in geography.

In some embodiments, registration mechanism 520, presenting mechanism 540, and authentication mechanism 550 can be part of processor 500. Further, in some embodiments, the system may not include a separate processor and memory. Instead, in addition to performing their specific tasks, registration mechanism 520, presenting mechanism 540, and/or authentication mechanism 550 may function as general purpose computation engines.

Storage 530 stores programs to be executed by processor 500. Specifically, storage 530 stores a program that implements a system (application) for authentication. During operation, the authentication program can be loaded from storage 530 into memory 510 and executed by processor 500. As a result, authentication system 100 can perform the functions described above. Authentication system 100 can be coupled to an optional display 580, keyboard 560, and pointing device 570.

In an embodiment, user 150 of user's computer 140 initiates a request for a registration process. This request is forwarded to registration mechanism 520. Processor 500 then actives the registration mechanism to register user 150's username, password, and unique identifier; create an association between the username, password, and unique identifier; and store the association in memory 510 or storage 530.

Upon a subsequent request for login, the processor 500 activates presenting mechanism 540, which presents a login screen to the user with the username field enabled and password field disabled. Processor 500 then activates authenticating mechanism 550 to authenticate the user based on the username, password, and unique identifier. As part of this activation, authenticating mechanism 550 receives the unique identifier via authenticated channel 190.

In the various embodiments of authentication system 100, each of the mechanisms 520-550 outlined above can be implemented as portions of a suitably programmed general-purpose computer. Alternatively, mechanisms 520-550 can be implemented as physically distinct hardware circuits within an ASIC, or using a FPGA, a PDL, a PLA or a PAL, or using discrete logic elements or discrete circuit elements. It will be evident to practitioners skilled in the art that the particular form each of the mechanisms 520-550 outlined above can depend on one or more design choices.

Moreover, authentication system 100 and/or each of the various mechanisms discussed above can be implemented as software routines, managers or objects executing on a programmed general purpose computer, a special purpose computer, a microprocessor or the like. In this case, authentication system 100 and/or each of the various mechanisms discussed above can be implemented as one or more routines embedded in the communications network, as a resource residing on a server, or the like. Authentication system 100 and the various mechanisms discussed above can also be implemented by physically incorporating authentication system 100 into a software and/or hardware system, such as the hardware and software systems of a web server or a client device.

As shown in FIG. 5, memory 510 can be implemented using any appropriate combination of alterable, volatile or non-volatile memory, or non-alterable or fixed memory. The alterable memory, whether volatile or non-volatile, can be implemented using any one or more of static or dynamic RAM, a floppy disk and disk drive, a (re)writable optical disk and disk drive, a hard drive, flash memory, or the like. Similarly, the non-alterable or fixed memory can be implemented using any one or more of ROM, PROM, EPROM, EEPROM, an optical ROM disk, such as a CD-ROM or DVD-ROM disk, or the like.

Similarly, the communication links (data network 130, wireless network 170, and data network 110) can each be any known or later developed device or system for connecting a communication device to authentication system 100, including a direct cable connection, a connection over a wide area network or a local area network, a connection over an intranet, a connection over the Internet, or a connection over any other distributed processing network or system. In general, these communication links can be any known or later developed connection system or structure usable to connect devices and facilitate communication.

Further, the communication links can be wired or wireless links to a network. The network can be a local area network, a wide area network, an intranet, the Internet, or any other distributed processing and storage network.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executed method to authenticate a user, comprising:

registering the user by:
    receiving a username, a password, and a unique identifier, which are associated with the user;
    creating an association between the username, the password, and the unique identifier; and
    storing the association;

presenting a login screen to the user which includes a username field and a password field, wherein the username field is enabled and the password field is disabled; and authenticating the user by:
    receiving the username via the username field;
    receiving the unique identifier over an authenticated channel, wherein the authenticated channel comprises a phone network, and wherein the unique identifier is received over the authenticated channel from a user that uses a phone to call an authentication phone number, wherein the authentication phone number is a unique phone number that is associated with the user while registering the user;
    enabling the password field in response to determining that the unique identifier is associated with the received username;
    receiving the password via the enabled password field; and
    authenticating the user in response to determining that the password is associated with the username.

2. The method of claim 1, wherein the unique identifier includes a phone number uniquely associated with the phone that the user uses to call the authentication phone number.

3. The method of claim 2, wherein the unique identifier is received over the authenticated channel when the user uses the phone to call the authentication phone number.

4. The method of claim 1, wherein the unique identifier includes a random number uniquely associated with the user.

5. The method of claim 4, wherein the unique identifier is received over the authenticated channel when the user uses the phone to call the authentication phone number and enters the random number.

6. The method of claim 1, wherein receiving the unique identifier over the authenticated channel includes one of:
    the user calling the authentication phone number; or
    the user sending an SMS (short message service) message to the authentication phone number.

7. The method of claim 1, wherein the authentication phone number is a toll-free number.

8. An apparatus to authenticate a user, comprising:

a registering mechanism configured to register the user by:
    receiving a username, a password, and a unique identifier, which are associated with the user;
    creating an association between the user and the username, the password, and the unique identifier; and
    storing the association;

a presenting mechanism configured to present a login screen to the user which includes a username field and a password field, wherein the username field is enabled and the password field is disabled; and an authenticating mechanism configured to authenticate the user by:
    receiving the username via the username field;
    receiving the unique identifier over an authenticated channel, wherein the authenticated channel comprises a phone network, and wherein the unique identifier is received over the authenticated channel from a user that uses a phone to call an authentication phone number, wherein the authentication phone number is a unique phone number that is associated with the user while registering the user;

enabling the password field in response to determining that the unique identifier is associated with the received username;

receiving the password via the enabled password field; and authenticating the user in response to determining that the password is associated with the username.

9. The apparatus of claim 8, wherein the unique identifier includes a phone number uniquely associated with the phone that the user uses to call the authentication phone number.

10. The apparatus of claim 9, wherein the unique identifier is received over the authenticated channel when the user uses the mobile phone to call the authentication phone number.

11. The apparatus of claim 8, wherein the unique identifier includes a random number uniquely associated with the user.

12. The apparatus of claim 11, wherein the unique identifier is received over the authentication channel when the user uses the mobile-phone to call the authentication phone number and enters the random number.

13. The apparatus of claim 8, wherein receiving the unique identifier over the authenticated channel includes one of:
the user calling the authentication phone number; or
the user sending an SMS (short message service) message to the authentication phone number.

14. The apparatus of claim 8, wherein the authentication phone number is a toll-free number.

15. A computer-readable storage device storing instructions that when executed by a computer cause the computer to perform a method to authenticate a user, the method comprising:

registering the user by:
receiving a username, a password, and a unique identifier, which are associated with the user;
creating an association between the username, the password, and the unique identifier; and
storing the association;

presenting a login screen to the user which includes a username field and a password field, wherein the username field is enabled and the password field is disabled; and authenticating the user by:
receiving the username via the username field;
receiving the unique identifier over an authenticated channel, wherein the authenticated channel comprises a phone network, and wherein the unique identifier is received over the authenticated channel from a user that uses a phone to call an authentication phone number, wherein the authentication phone number is a unique phone number that is associated with the user while registering the user;

enabling the password field in response to determining that the unique identifier is associated with the received username;

receiving the password via the enabled password field; and authenticating the user in response to determining that the password is associated with the username.

16. The computer-readable storage device of claim 15, wherein the unique identifier includes a phone number uniquely associated with the phone that the user uses to call the authentication phone number.

17. The computer-readable storage device of claim 15, wherein receiving the unique identifier over the authenticated channel includes one of:
the user calling the authentication phone number; or
the user sending an SMS (short message service) message to the authentication phone number.

18. The computer-readable storage device of claim 15, wherein the unique identifier includes a random number uniquely associated with the user.

19. The computer-readable storage device of claim 16, wherein the unique identifier is received over the authenticated channel when the user uses the phone to call the authentication phone number.

20. The computer-readable storage device of claim 18, wherein the unique identifier is received over the authentication channel when the user uses the phone to call the authentication phone number and enters the random number.

21. The computer-readable storage device of claim 15, wherein the authentication phone number is a toll-free number.

* * * * *